April 3, 1928.  1,664,807
L. C. COLE
ROTATING CUTTER HEAD
Filed April 2, 1926   2 Sheets-Sheet 1

INVENTOR
L. C. Cole
BY Joseph K. Schofield
ATTORNEY

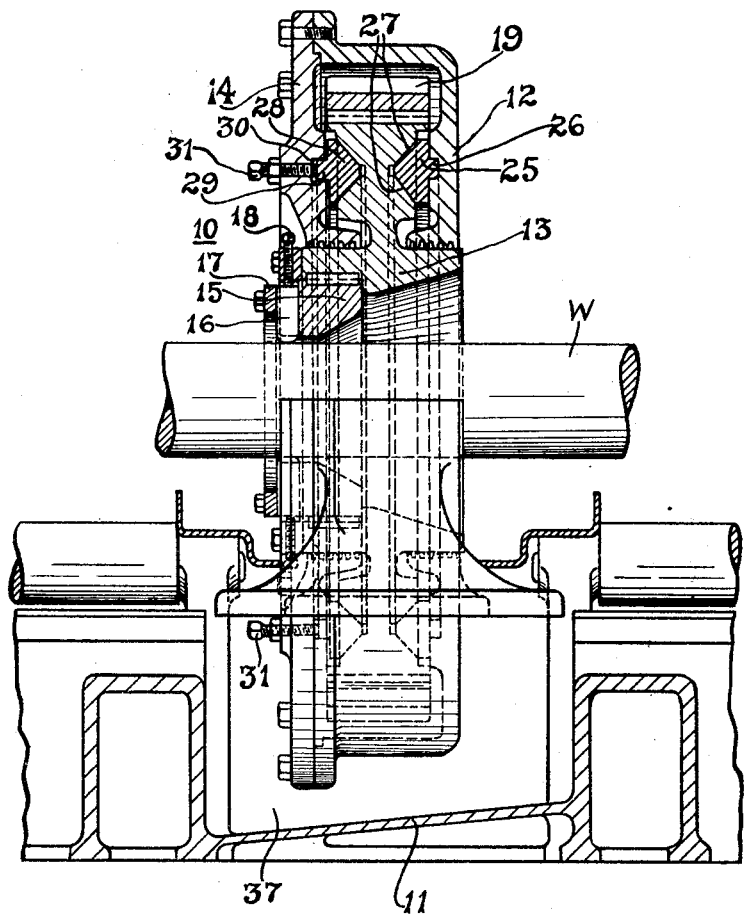

Patented Apr. 3, 1928.

1,664,807

UNITED STATES PATENT OFFICE.

LYNDON C. COLE, OF HAMILTON, OHIO, ASSIGNOR TO NILES-BEMENT-POND COMPANY, OF NEW YORK, N. Y., A CORPORATION OF NEW JERSEY.

ROTATING CUTTER HEAD.

Application filed April 2, 1926. Serial No. 99,314.

This invention relates to metal cutting machines and in particular to a revolving cutter head adapted for a machine for cutting heavy shafting.

An object of the invention is to provide a cutter head of improved construction having a plurality of angularly spaced cutters mounted upon a rotatable annular member surrounding the work being operated upon and through which the work passes.

One feature which is of importance is that the annular member on which the cutting tools are mounted is rotatably supported and mounted within a body member upon improved guides or bearing members and is adapted to be rotated by means of a gear keyed to the periphery of the annular member.

Another feature of importance is that the annular member is supported for rotation upon a fixed axis by its guides or bearing members which have opposed conical engaging surfaces.

Another object of the invention is to provide an improved method of adjusting the bearing members for the annular member, these bearing strips or members being adapted to engage opposite sides of the annular member.

One of these bearing members is adapted to be retained fixedly in position within the body member of the cutter head and the oppositely disposed bearing member is adapted to be adjusted axially and parallelly toward or from the first bearing member while being maintained against lateral movements so that wear may be taken up and lost motion be prevented without displacing the rotatable member.

Another feature of importance is that the bearing members are angular in cross section so that each bearing member is provided with two conical surfaces engaging corresponding conical surfaces upon the opposite sides of the annular member.

Another object of advantage is that small annular spaces or recesses between the contiguous surfaces of the body member and the rotatable member are provided to retain the cutting compound used on the tools and the lubricant contained within the body member. Also draining conduits are connected with these recesses or spaces so that the cutting compound will be kept out of the body member and the lubricant will be retained within the body member.

With these and other objects in view, my invention consists in the features of construction and operation set forth in the following specification and illustrated in the accompanying drawings.

In the accompanying drawings annexed hereto and forming a part of this specification, I have shown my invention embodied in a cutter head for a shafting cutting machine but it will be understood that the invention can be otherwise embodied and that the drawings are not to be construed as defining or limiting the scope of the invention, the claims appended to this specification being relied upon for that purpose.

In the drawings:

Fig. 2 is a front elevation, parts being broken away to show the form and disposition of the bearing members.

Figure 1:
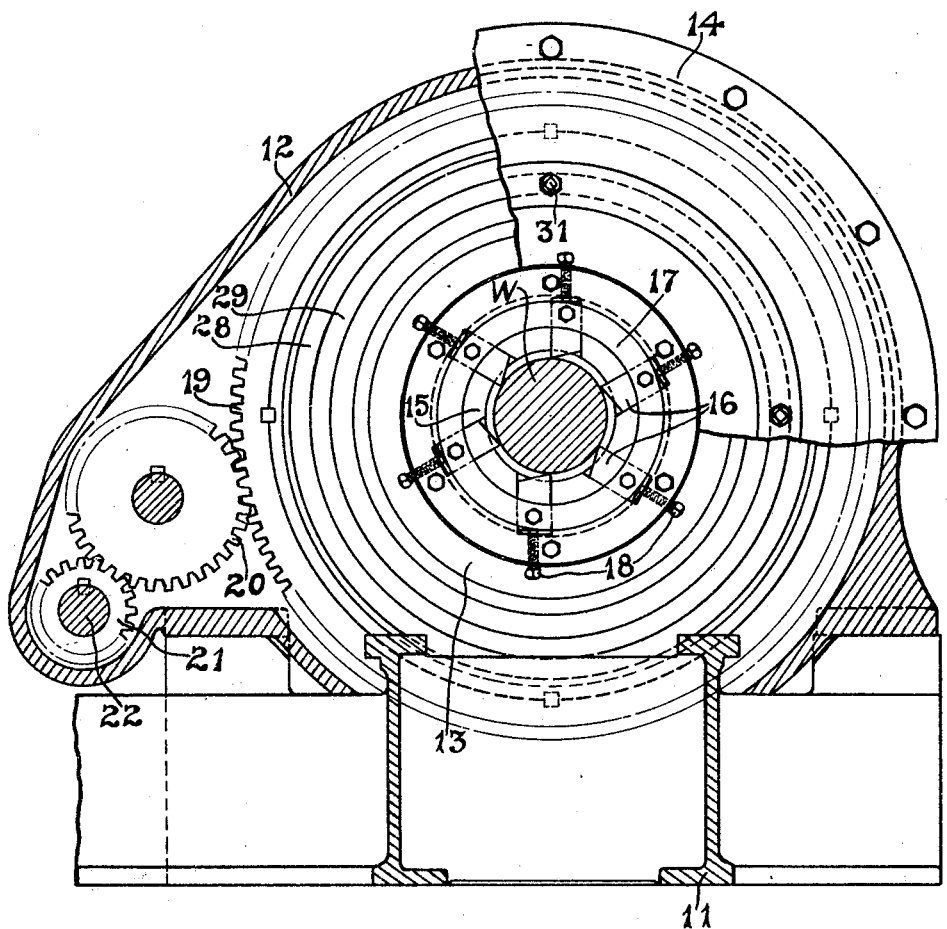
Figure 1 is a side elevation of the complete cutter head, parts being broken away to more clearly disclose the construction.
Figure 3:
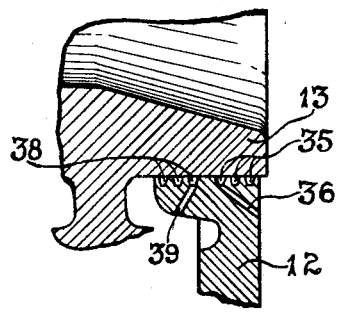
Fig. 3 is a detail of construction showing the recesses and draining conduits formed within the body member.

In the above mentioned drawings I have shown but one embodiment of the invention which is now deemed preferable, but it is to be understood that changes and modifications may be made within the scope of the appended claims without departing from the spirit of the invention.

Briefly and in its broadest aspect, my invention comprises the following principal parts: first, a body member adapted to be mounted on and secured rigidly to the bed of a metal cutting machine; second, an annular member rotatably mounted within the body member; third, a driving gear keyed directly to the outer periphery of the annular member; fourth, a pluralitay of cutting tools adjustably mounted upon a hollow holder adapted to be held in a recess provided within the annular member; fifth, an annular bearing member fixedly positioned within the body member; sixth, a corresponding bearing member disposed oppositely to the first bearing member and adapted to be adjusted axially toward and from the first bearing member; seventh, opposed conical bearing surfaces on these bearing members adapted to contact with corresponding conical surfaces on the annular member; eighth, annular recesses formed between the contiguous surfaces of the body member and annular member; and ninth, drain conduits from said recesses extending to points respectively inside and outside of said body member.

Referring more in detail to the figures of the drawings, I show a revolving cutter head 10 mounted upon the base 11 of a machine for cutting shafting adapted to support work W and advance it axially through the cutter head 10. As the means for supporting the work W (without rotation) and for advancing or feeding it past or through the cutter head 10 form no part of the present invention, it is not thought necessary to describe or illustrate them. It will be understood, however, that the cutter head 10 may be adapted to be used in connection with any metal cutting machine having suitable work supporting means and means for relatively feeding the work and cutters. The body member 12, as shown, is of annular form so that the work W and annular cutter supporting and rotating member 13 may surround the work W being operated on. The body member 12 also is provided with a removable side face or head 14 rigidly secured to the body member 12 to properly enclose the operative parts 13.

The annular member 13, as shown, is provided with a cutter holder 15 in the form of a ring adapted to be keyed or otherwise secured in position within a recess provided therefor in the annular member 13. The cutting tools 16, preferably a plurality, are adjustably secured thereto in spaced relation to each other, a clamping ring 17 being provided for retaining them in clamped position and individual adjusting screws 18 being provided for properly positioning these cutters or tools 16 radially relative to the work W.

On the outer periphery of the annular member 13 is suitably keyed a spur gear 19 adapted to mesh with an intermediate gear 20 in mesh with a pinion 21 on a driving shaft 22, shown in Fig. 1. As any desirable means may be employed for rotating this shaft 22 and therefore driving the revolving annular cutter holding member 13, it is not thought that these means need to be described or shown.

Mounted on one side of the body member 13 and positioned concentrically with the axis about which the work W is supported, is an annular bearing member 25. This member 25 is provided with an annular tongue 26 engaging a corresponding circular recess in the body member 13. The bearing surfaces 27 for this member 25 are in the form of portions of opposed conical surfaces, as clearly shown in Fig. 2. These bearing surfaces 27 engage corresponding conical surfaces on the annular member 13. By means of this bearing or supporting member 25 the annular member 13 is constrained to rotate about a fixed axis.

On the opposite side of the annular member 13, a similar bearing member or strip 28 is provided, its tongue 29 adapted to fit within a circular recess 30 in the side cover plate 14 for the body member 12. This bearing member 28 has bearing surfaces in every way similar to those on the member 25 and is adapted to be adjusted axially toward and from the first bearing strip 25 by means of adjusting screws 31, a number of which are provided circularly disposed about the cover plate 14. By means of this adjustment of the bearing member 28, the annular member 13 can be suitably supported between these opposed bearing members without lost motion or any tendency to get out of alignment with the axis of the work. As the contacting surfaces on members 25 and 28 become worn, it is only necessary to laterally adjust this guide or bearing member 28 by the screws 31.

Between the cylindrical surfaces of the rotatable annular member 13 and the internal surfaces at the central opening of the body member 12 and the cover plate 14, means are provided to prevent any cutting fluid from entering the enclosed portion of the body member 12 and also for preventing lubricant for the driving gear 19 and annular member 13 from leaking outward. This means comprises a plurality of annular recesses 35 preferably formed in the body member 12 and its cover plate 14 on their internal cylindrical surfaces. One of the outer recesses 35 is provided with an opening or conduit 36 permitting any cutting fluid therein to drain outwardly and downwardly into a tank 37 for the cutting compound. The inner recesses 38 are provided with an opening or conduit 39 adapted to drain inwardly and downwardly so that lubricant escaping from the body member 12 through these recesses 38 may be returned to the space within the body member 12.

What I claim is:

1. A revolving cutter head for metal cutting machines comprising in combination, a body member, an annular member rotatably mounted therein, cutting tools mounted on said annular member, means to rotate said annular member, and removably positioned bearing members therefor engaging opposite sides of said annular member and adapted to retain the annular member against axial movement.

2. A revolving cutter head for metal cutting machines comprising in combination, a body member, an annular member rotatably mounted therein, cutting tools mounted on said annular member, means to rotate said annular member, and circular bearing members therefor engaging opposite sides of said annular member and adapted to support and retain the annular member upon a fixed axis, one of said bearing members being fixed in position and the other axially adjustable.

3. A revolving cutter head for metal cutting machines comprising in combination, a body member, an annular member rotatably mounted therein, cutting tools mounted on said annular member, means to rotate said annular member, a fixed bearing member removably mounted in said body member adapted to support the annular member and engaging one side thereof, and an axially adjustable bearing member removably mounted in said body member adapted to engage the opposite side of said annular member.

4. A revolving cutter head for metal cutting machines comprising in combination, a body member, an annular member rotatably mounted therein, cutting tools mounted on said annular member, means to rotate said annular member, a fixed bearing member having conical engaging surfaces removably mounted in said body member and adapted to support the annular member and engaging one side thereof, and an axially adjustable bearing member removably mounted in said body member and adapted to engage the opposite side of said annular member.

5. A revolving cutter head for metal cutting machines comprising in combination, a body member, an annular member rotatably mounted therein, cutting tools mounted on said annular member, means to rotate said annular member, a fixed bearing member removably mounted in said body member adapted to support the annular member and engaging one side thereof, and an adjustable bearing member removably mounted in said body member and adapted to engage the opposite side of said annular member, each of said bearing members having opposed conical surfaces engaging said annular member.

6. A revolving cutter head for metal cutting machines comprising in combination, a body member, an annular member rotatably mounted therein, cutting tools mounted on said annular member, means to rotate said annular member, a fixed circular bearing member removably mounted in said body member adapted to support the annular member and engaging one side thereof, and an axially adjustable bearing member removably mounted in said body member parallel with said fixed bearing member and adapted to engage the opposite side of said annular member.

7. A revolving cutter head for metal cutting machines comprising in combination, a body member, an annular member rotatably mounted therein, cutting tools mounted on said annular member, means to rotate said annular member, a fixed bearing member removably mounted in said body member adapted to support the annular member and engaging one side thereof, and an axially adjustable bearing member removably mounted in said body member adapted to engage the opposite side of said annular member, each of said bearing members having circular projections adapted to engage within corresponding recesses in said body member.

8. A rotating cutter head for metal cutting machines comprising in combination, a body member, an annular member rotatable therewithin, annular oil retaining recesses in one of said members contiguous with the contacting surface of the other member, a drain conduit connecting one of said recesses with the outside of said body member, and another conduit connecting another recess with the inside of said body member.

9. A rotating cutter head for metal cutting machines comprising in combination, a body member, an annular member rotatable therewithin, annular oil retaining recesses in one of said members contiguous with the contacting surface of the other member, a drain conduit connecting an outer recess with the outside of said body member, and another conduit connecting an inner recess with the inside of said body member.

In testimony whereof, I hereto affix my signature.

LYNDON C. COLE.